United States Patent [19]

Cho

[11] Patent Number: 4,797,239

[45] Date of Patent: Jan. 10, 1989

[54] FOAM PIG WITH TEXTURED SURFACE

[75] Inventor: Hyun J. Cho, Tulsa, Okla.

[73] Assignee: T. D. Williamson, Inc., Tulsa, Okla.

[21] Appl. No.: 36,877

[22] Filed: Apr. 9, 1987

[51] Int. Cl.⁴ .............................................. B29C 67/20
[52] U.S. Cl. ........................................ 264/45.5; 264/53
[58] Field of Search .................. 264/45.5, 53; 521/173

[56] References Cited

U.S. PATENT DOCUMENTS

| | | | |
|---|---|---|---|
| 3,277,508 | 8/1966 | Knapp | 15/104.06 R |
| 3,844,523 | 10/1974 | Wilheim | 264/45.5 |
| 3,901,959 | 8/1975 | Allport et al. | 264/45.5 |
| 4,191,706 | 3/1980 | Marquis et al. | 528/68 |
| 4,444,704 | 4/1984 | Hira et al. | 264/45.5 |
| 4,464,320 | 8/1984 | Saidla | 264/45.5 |

Primary Examiner—Jan H. Silbaugh
Assistant Examiner—Allan R. Kuhns
Attorney, Agent, or Firm—Head & Johnson

[57] ABSTRACT

A method of making a foam pig having a highly textured and tough surface for use in cleaning the interior wall of a pipe line, the pig being formed by heating a metallic mold which defines the exterior configuration of the pig, injecting urethane base foam mixture into the heated mold, and curing the injected urethane foam before removing the cured pig from the mold. The mold should be heated to a temperature sufficient to produce a tought surface texture on the completed pig defined by closely spaced indentations of about one-half to three millimeters in depth, the indentations being formed by bubbles in the urethane foam base mixture on the surface of the mold.

5 Claims, 2 Drawing Sheets

FOAM PIG WITH TEXTURED SURFACE

SUMMARY OF THE INVENTION

The use of pigs in pipe lines is well known and pigs have various functions. One of the functions is to clean the interior wall of the pipe line. For this purpose pigs have been devised with various attachments for engaging the interior wall of the pipe line including the use of metal brushes and scrapers. While these devices serve important functions, in some instances it is desirable to be able to clean the interior of a pipeline without the use of metallic elements. The use of plastic for forming pipelines is a common practice and it can be foreseen that in the future more pipelines will be constructed of plastic because of the resistance of plastic pipe to corrosion. Whether used in plastic pipe or metal pipe, it is highly desirable to have available a pipeline pig configured to clean the interior wall of the pipeline in a way so as to substantially reduce the possibility of any damage to the pipeline. In addition, it is highly desirable to provide a pipeline pig for cleaning the interior of a pipeline in which the pig can be economically manufactured.

In the present invention the cleaning pig is formed as a unitary cylindrical body of more or less homogeneous material. By an unique method of manufacture of this invention the pig body is of elongated cylindrical construction with the outside diameter of the pig body being substantially that of the pipeline in which the pig is to be employed. The pig is formed utilizing a mold having a cavity therein which defines the desired exterior configuration of the pig. The mold is heated, such as by placing it in a furnace, to a temperature sufficient to produce a tough surface texture on the completed pig. By a "tough surface texture" is meant a texture defined by closely spaced indentations. In the preferred arrangement these indentations are about one-half to three millimeters in depth.

A urethane base foamable mixture is injected under pressure into the heated mold. The desired temperature of the mold to produce the tough surface texture depends somewhat on the particular composition of the urethane base foam, but tyically a mold temperature of about 130° F. to 150° F. is most desirable.

The interior of the mold is coated, such as by spraying, with a mold release agent prior to the injection of the urethane base foamable mixture.

After the foam has been injected under pressure it is permitted to cure until the pig formed within the mold is in a solid state. During the curing procedure, the mold temperature may be dropped. The normal curing time is about 20 to 30 minutes.

While other foam compositions may be employed a preferred composition is a medium-viscosity, modified diphenylmethane diisocyanate containing a high percentange of diphenylmethane diisocyanide and a lesser amount of diphenylmethane diisocyanate adducts and a medium to low-viscosity polyester base polyol including 1, 4-Butanediol, a blowing agent and at least one catalyst.

The tough surface texture is achieved by a continuum of closely spaced indentations each formed by a minute gas bubble on the surface of the mold as the pig is formed. Each indentation is about one-half to three millimeters in depth. Separating the indentations are walls integrally formed with the foam pig, the walls typically being in the form of a continuum, and the walls form the external surface of the cylindrical pipeline pig. The walls separating the indentations being relatively thin and the material of which the walls are formed being compressed by the adjacent bubbles, are tough and form the tough surface texture of the pipeline pig.

For reference to prior issued United States Patents which relate to the subject matter of the present invention the following should be considered: U.S. Pat. Nos. 4,077,079; 3,543,323; 3,863,287; 3,543,324; 3,725,968; 3,277,508; 3,389,417; 4,242,771; 3,133,853 and 3,011,197.

A better understanding of the invention will be had by reference to the following description and claims, taken in conjunction with the attached drawings.

DESCRIPTION OF THE PREFERRED EMBODIMENT

Figure 2:
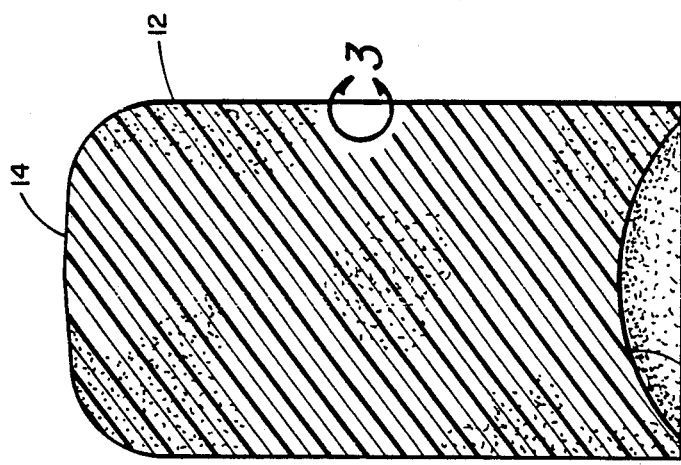
FIG. 2 is a cross-sectional view, at a slightly reduced scale, taken along the line 2—2 of FIG. 1.
Figure 1:
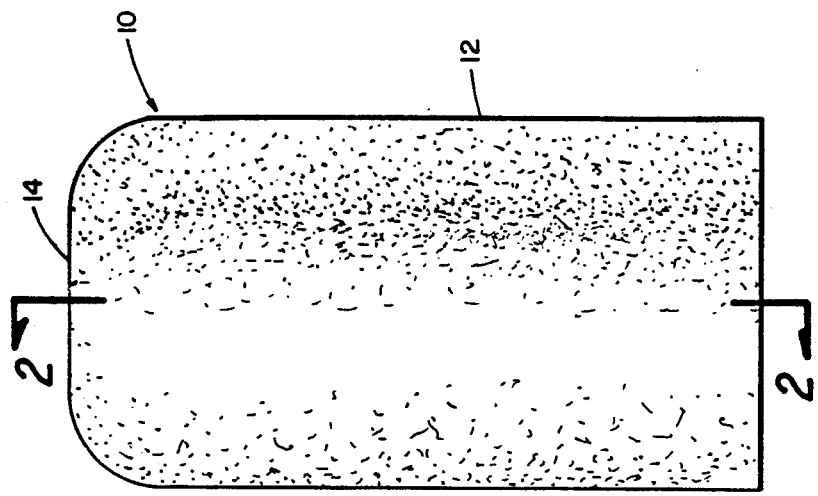
FIG. 1 is an external view of a pipeline pig according to this invention showing one typical configuration for the pig.

Referring to the drawings, FIG. 1 is an external view of a pipeline pig according to the present invention, the pig being generally indicated by the numeral 10. The pig has an external cylindrical surface 12 of a diameter substantially equal to that of the internal diameter of the pipeline in which the pig is to be employed. The pig 10 has a forward end 14 which is rounded as illustrated so as to cause the pig to pass more freely through the interior of a pipeline. The rearward surface 16 is preferably concaved as illustrated in FIG. 2. The pig of this invention is of the type which is moved through the pipeline by the force of fluid flow. By the use of the concaved rear surface 16 the force of the fluid flow more effectively carries the pig with the fluid through the pipeline.

Manufacturing pipeline pigs of foam is well known and the specific configurations of pipeline pigs made of foam are not substantially dissimilar to that shown in FIGS. 1 and 2. The present invention is directed towards a pig and a method of manufacturing thereof, which provides a highly improved tough textured surface 12 which has a slight abrading characteristic so that as the pig passes through a pipeline it scours and cleans the interior wall of the pipeline and in a way which does not utilize metal brushes or scrapers.

Figure 3:
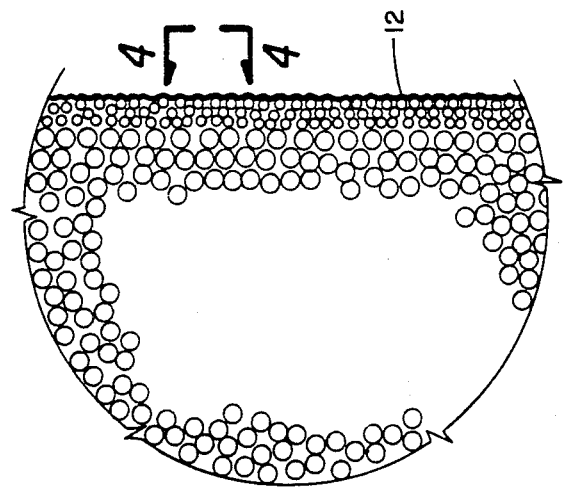
FIG. 3 is an enlarged view of the appearance of a small cross-sectional piece of the pipeline pig as taken at 3—3 of FIG. 2.

FIG. 3 is an enlarged cross-sectional view of a small portion of the pig and shows diagrammatically the cross-section achieved by manufacturing the pig of cured urethane based foam.

Figure 4:
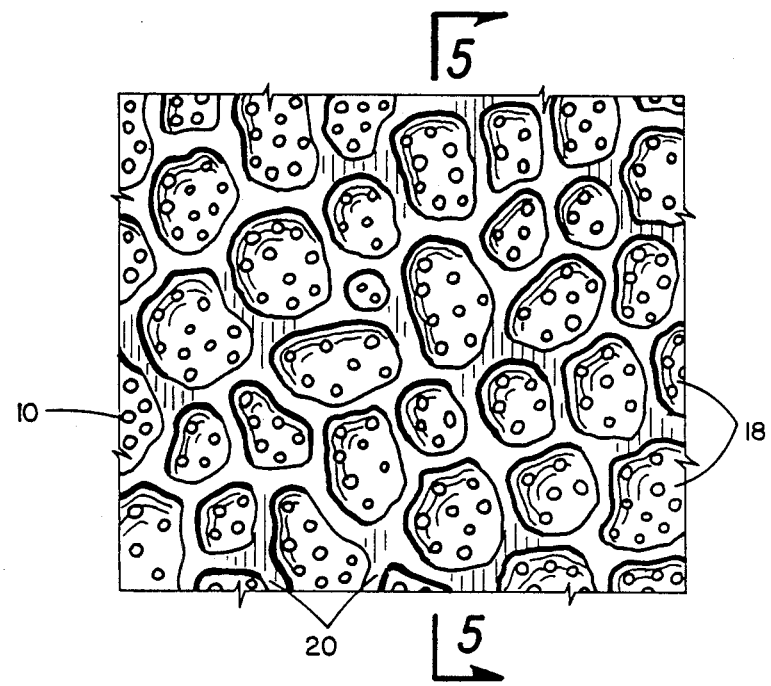
FIG. 4 is an enlarged view of the surface of the pipeline pig showing the closely spaced indentations therein.
Figure 5:
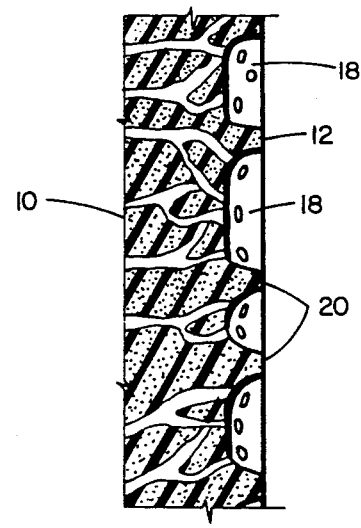
FIG. 5 is an enlarged cross-sectional view of the surface of the pipeline pig showing the indentations and the walls between the indentations which form the tough textured surface of the pig.

FIGS. 4 and 5 show the surface of the pipeline pig in magnified detail. FIG. 4 is a plane view of a small area of the surface and FIG. 5 is a highly enlarged view of a small portion of the surface. The surface is made up of closely spaced indentations 18 which, as will be described in more detail subsequently, are formed by small gas bubbles adhering to the wall of the mold in which the pig is formed. The indentations are of about one-half to three millimeters in depth and very considerably in diameter or cross-sectional area. However, the wall 20 between the indentations 18 is of a generally more uniform thickness and forms a continuum which actually defines the external surface 12 of the pipeline pig.

In the method of manufacturing of the invention a mold is formed having an interior configuration corresponding to the desired exterior shape of the pig. The mold is heated, either by applying heat directly to the exterior of the mold, by heating elements embedded in the wall of the mold, or by heating the mold in an oven to a carefully controlled temperature. It has been determined that for a urethane based foamable mixture the mold temperature should be about 130° F. to 150° F. The mold is heated to a temperature sufficient to produce a tough surface texture on the completed big defined by closely spaced indentations of about one-half to three millimeters in depth. These indentations are formed by small gas bubbles which adhere to the interior surface of the mold and the temperature of the mold is critical in controlling the formation, size and depth of the bubbles in combination with the specific urethane based foam material of which the pig is made.

Preparatory to filling the mold with urethane based foamable material, the interior mold surface is sprayed with a commercially available mold release. Thereafter, the urethane based foamable mixture is injected into the heated mold under pressure. After filling the mold to the prescribed pressure, the mold is allowed to cure for a period of about 20 to 30 minutes. After curing the mold may be opened and the cured urethane foam pig removed.

The foamable mixture injected into the mold is a clear, medium-viscosity, modified diphenylmethane diisocyanate containing a high percentage of pure diphenylmethane diisocyanate and a lesser amount of diphenylmethane diisocyanate adducts, and a medium to low viscosity polyester based polyol including 1, 4-Butanediol, blowing agents and a combination of catalysts. Blowing agents and catalysts are well known to those skilled in the art and therefore, it is not necessary to more particularly describe these elements.

The most common urethane foam formulations are based on a combination of polyether polyols or a polyester polyol with a toluene diisocyanate or a diphenylmethane diisocyanate. The known foam materials of which foam pigs are typically made do not have good enough physical properties, such as tear strength, abrasion resistance and tensile strength. Due to the poor properties of the known foam pigs, a protective coating is required to protect the foam body material. The preferred foam based composition described above has enough physical properties so that the foam pig can be used without a protective coating.

The foam composition of the present invention is a combination of a specific polyester polyol, 1, 4-Butanediol, blowing agents and catalysts with a clear, medium-viscosity, modified diphenylmethane diisocyanate containing a high percentage of pure diphenylmethane diisocyanate and a lesser amount of diphenylmethane diisocyanate adducts.

The preferred foam can be processed by use of a high pressure reaction injection machine which is equipped with a high pressure impingement mixing device as well as other conventional process methods, such as hand mix or ordinary dispensing machine for manufacturing or molding the foam pig with a density of as low as 2.5 pounds per cubic feet. The formulation uses 44±3 weight percent of pure adducts of diphenylmethane diisocyante, 44±3 weight percent of the polyester polyol which must be the nominal molecular weight of 450–1000 and of viscosity in the range of 120–500 centipoise at 140° F. measured by Brookfield LVF viscometer, 1.33 weight percent of Freon-113, 0.063 weight percent of catalysts, and remaining balance of color.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing a pipeline pig having a rough textured surface comprising:
   (a) forming a mold having a cavity therein defining the desired exterior configuration of the pipeline pig;
   (b) heating the mold to a temperature elevated above ambient to about 130° F. to 150° F.;
   (c) injecting a urethane based foamable mixture into the heated mold;
   (d) causing the mold to be filled with the injected urethane based foam and curing the injected urethane based foam within the mold for about 20 to 30 minutes;
   (e) controlling the temperature of the mold in step (b) and the curing time in step (d) such as to produce on the molded pig a tough (texture) textured surface defined by closely spaced indentations of about ⅛ to 3 mm. in depth; and
   (f) removing the cured pig from the mold.

2. The method according to claim 1 wherein step (c) includes injecting a medium viscosity, modified diphenylmethane diisocyanate containing a high percentage of diphenylmethane diisocyanate and a lesser amount of diphenylmethane diisocyanate adducts and a medium to low viscosity polyester based polyol including 1, 4-butanediol, a blowing agent and at least one catalyst.

3. The method according to claim 2 wherein the urethane based foamable mixture comprises about 41 to 47% by weight of pure adducts of diphenylmethane diisocyanate, about 41 to 47% by weight of polyester polyol of nominal molecular weight of 450–1000 and of viscosity in the range of 120 to 500 centipoise at 140° F. measured by the Brookfield LVF viscometer, about 1.33% by weight of Freon-113, about 0.063% by weight catalyst, and the balance color.

4. The method according to claim 1 wherein, prior to step (c), the interior of the mold is sprayed with a mold release.

5. The method according to claim 4 wherein the mold release is silicone based.

* * * * *